United States Patent [19]
Nakai et al.

[11] Patent Number: 5,670,069
[45] Date of Patent: Sep. 23, 1997

[54] LASER PROCESSING METHOD

[75] Inventors: Izuru Nakai, Osaka; Toshiharu Okada, Ibaraki; Yuji Uesugi, Osaka, all of Japan

[73] Assignee: Matsushita Electric Industrial Co., Ltd., Osaka, Japan

[21] Appl. No.: 576,640

[22] Filed: Dec. 21, 1995

[30] Foreign Application Priority Data

Dec. 22, 1994 [JP] Japan .................................. 6-320236

[51] Int. Cl.⁶ ...................................................... B23K 26/06
[52] U.S. Cl. ............................ 219/121.73; 219/121.64; 219/121.72
[58] Field of Search .......................... 219/121.6, 121.61, 219/121.64, 121.66, 121.69, 121.71, 121.72, 121.73, 121.76, 121.77, 121.8

[56] References Cited

U.S. PATENT DOCUMENTS

| | | | |
|---|---|---|---|
| 4,689,482 | 8/1987 | Horikawa et al. | 219/121 CA |
| 5,055,653 | 10/1991 | Funami et al. | 219/121.75 |
| 5,237,149 | 8/1993 | Macken | 219/121.73 |
| 5,248,878 | 9/1993 | Ihara | 219/121.69 |

*Primary Examiner*—Mark Hellner
*Attorney, Agent, or Firm*—Wenderoth, Lind & Ponack

[57] ABSTRACT

A laser processing method is carried out by a laser apparatus comprising: an oscillator; a spatial filter comprising a first convex lens, a member having a pinhole portion, and a second convex lens on an optical axis of the laser beam from an oscillator; two galvano-mirrors; and an fθ lens. The method includes: emitting a laser beam from the oscillator, focusing the laser beam by the first convex lens, removing non-focusing components in a peripheral portion of a focusing spot performed by the first convex lens by passing the laser beam which has passed through the first convex lens through the pinhole portion, a focal distance of the first convex lens being set so that a focusing diameter of the laser beam at the pinhole portion of the member is equal to or smaller than a focusing diameter of the laser beam which has passed through the fθ lens, restoring the laser beam which has passed through the pinhole portion into a parallel laser beam by the second convex lens, scanning the laser beam which has passed through the second convex lens by means of the two galvano-mirrors, and focusing the scanned laser beam by means of the fθ lens on a work to execute processing of the work.

11 Claims, 4 Drawing Sheets

LASER PROCESSING METHOD

BACKGROUND OF THE INVENTION

The present invention relates to a laser processing method. Specifically, for example, the laser processing method is preferable for processing multi-layer printed wiring board made of resin such as glass epoxy resin or aramid epoxy resin.

FIG. 6 is a perspective view of a conventional laser processing apparatus employing a galvano-mirror and an fθ lens. In FIG. 6, when laser processing is performed by combining the galvano-mirror 4 with the fθ lens 5, a laser beam 1 emitted from a laser oscillator (not shown) is incident on the galvano-mirror 4 directly or after passing through a beam expander (not shown).

According to the conventional method, the laser beam 1 emitted from the laser oscillator does not have an ideal Gaussian mode, and therefore it contains many higher mode components and optical spatial noise components. Consequently, a spot diameter R5 at a focusing point 5a of the laser beam 1 which has passed through the fθ lens 5 increases, resulting in traces of processing. Furthermore, at a focusing point 5b of the laser beam 1 which has passed through a peripheral portion of the fθ lens 5, the shape of the focusing spot tends to be deformed from a circular shape into an oval shape, and this has resulted in an issue that a shape variation is generated depending on the processing position.

SUMMARY OF THE INVENTION

Accordingly, an object of the present invention is to provide a laser processing method for reducing a focusing spot diameter of a laser beam which has passed through a fθ lens by removing higher mode components and noise components of light.

Another object of the present invention is to provide a laser processing method capable of obtaining substantially identical focusing spot shape at a focusing point of a laser beam which has passed through a center portion of the fθ lens and at a focusing point of a laser beam which has passed through a peripheral portion of the fθ lens.

In accomplishing these and other aspects, according to a first aspect of the present invention, there is provided a laser processing method which is carried out by a laser apparatus comprising: an oscillator; a spatial filter comprising a first convex lens, a member having a pinhole portion, and a second convex lens on an optical axis of the laser beam from an oscillator; two galvano-mirrors; and an fθ lens, the method comprising steps of:

emitting a laser beam from the oscillator;

focusing the laser beam by the first convex lens;

removing non-focusing components in a peripheral portion of a focusing spot performed by the first convex lens by passing the laser beam which has passed through the first convex lens through the pinhole portion, a focal distance of the first convex lens being set so that a focusing diameter of the laser beam at the pinhole portion of the member is equal to or smaller than a focusing diameter of the laser beam which has passed through the fθ lens;

restoring the laser beam which has passed through the pinhole portion into a parallel laser beam by the second convex lens;

scanning the laser beam which has passed through the second convex lens by means of the two galvano-mirrors; and focusing the scanned laser beam by means of the fθ lens on a work to execute processing of the work.

According to a second aspect of the present invention, there is provided the laser processing method, wherein a hole diameter of the pinhole portion of the member is set to 1 to 2 times, preferably 1 to 1.4 times, as great as a diameter of the focusing spot at a focusing point of the first convex lens, while the focusing spot diameter of the laser beam focused by the first convex lens which is a diameter of a portion at which laser beam intensity becomes $1/e^2$ of its peak intensity.

According to a third aspect of the present invention, there is provided the laser processing method wherein the oscillator is a $CO_2$ laser oscillator.

According to a fourth aspect of the present invention, there is provided the laser processing method further comprising, between the restoring and scanning steps, a step for removing non-focusing components in a peripheral portion of the parallel laser beam formed by the second convex lens by passing the parallel laser beam through a circular aperture of a member arranged between the second convex lens and an entrance of the galvano-mirrors on an optical axis of the laser beam from the oscillator.

According to a fifth aspect of the present invention, there is provided the laser processing method, wherein a diameter of the circular opening of the aperture member is set to a diameter 1 to 1.5 times as great as a diameter of a portion at which intensity of the laser beam becomes $1/e^2$ of its peak intensity.

According to a sixth aspect of the present invention, there is provided a laser processing method which is carried out by a laser apparatus comprising: an oscillator; two galvano-mirrors; an fθ lens; and a member having a circular aperture before an entrance of the galvano-mirrors on an optical axis of the laser beam from the oscillator, the method comprising steps of:

emitting a laser beam from the oscillator;

removing non-focusing components in a peripheral portion of the laser beam from the oscillator by passing the laser beam which is emitted from the oscillator through the circular aperture;

scanning the laser beam which has passed through the circular aperture by means of the two galvano-mirrors; and focusing the scanned laser beam by means of the fθ lens on a work to execute processing of the work.

According to a seventh aspect of the present invention, there is provided the laser processing method wherein a diameter of the circular opening of the aperture member is set to a diameter 1 to 1.5 times as great as a diameter of a portion at which intensity of the laser beam becomes $1/e^2$ of its peak intensity.

According to an eighth aspect of the present invention, there is provided the laser processing method as claimed in claim 11, wherein the oscillator is a $CO_2$ laser oscillator.

According to the aspect of the present invention, the member having pinhole portion is arranged in the focusing position of the first convex lens having the focal distance capable of obtaining the focusing spot diameter equal to or smaller than a spot diameter of an ideal Gaussian beam at the focusing point of the laser beam which has passed through the fθ lens, and the non-focusing components such as higher mode components at the optical spatial frequencies which cause an increase of the focusing spot diameter is cut off, so that the components for increasing the spot diameter at the focusing point of the fθ lens can be removed. With the above-mentioned arrangement, the focusing spot diameter of the laser beam which has passed through the fθ lens can be reduced to allow fine processing to be performed.

Furthermore, according to the another aspect of the present invention, the non-focusing components such as higher mode components at the optical spatial frequencies are cut off, so that the components for increasing the spot diameter at the focusing point of the laser beam which has passed through the fθ lens is removed to allow fine processing to be performed. In addition, the circular opening of the aperture member is inserted before the galvano-mirror on the optical axis of the laser beam to remove light in the peripheral portion of the laser beam. Thus, the cross-sectional shape of the laser beam is shaped into a circular shape, so that similar circular focusing spots can be obtained at the focusing point of the laser beam which has passed through the center portion of the fθ lens and at the focusing point of the laser beam which has passed through the peripheral portion of the fθ lens.

Furthermore, according to the still another aspect of the present invention, the circular opening of the aperture member is inserted before the galvano-mirror on the optical axis of the laser beam to remove light in the peripheral portion of the laser beam, so that non-focusing components such as astigmatism components are cut off and the cross-sectional shape of the laser beam is shaped into a circular shape. With the above-mentioned arrangement, similar circular focusing spots can be obtained at the focusing point of the laser beam which has passed through the center portions of the fθ lens and at the focusing point of the laser beam which has passed through the peripheral portion of the fθ lens.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
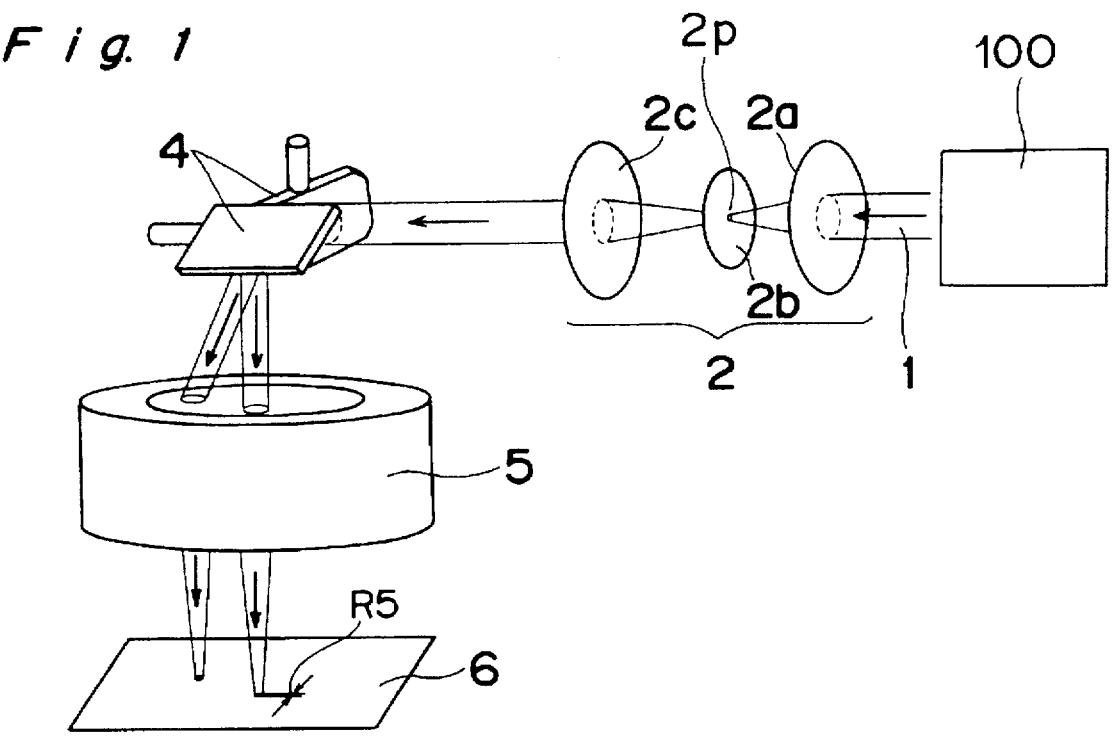
FIG. 1 is a perspective view of a laser processing apparatus according to a first embodiment of the present invention.

Before the description of the present invention proceeds, it is to be noted that like parts are designated by like reference numerals throughout the accompanying drawings.

Figure 2:
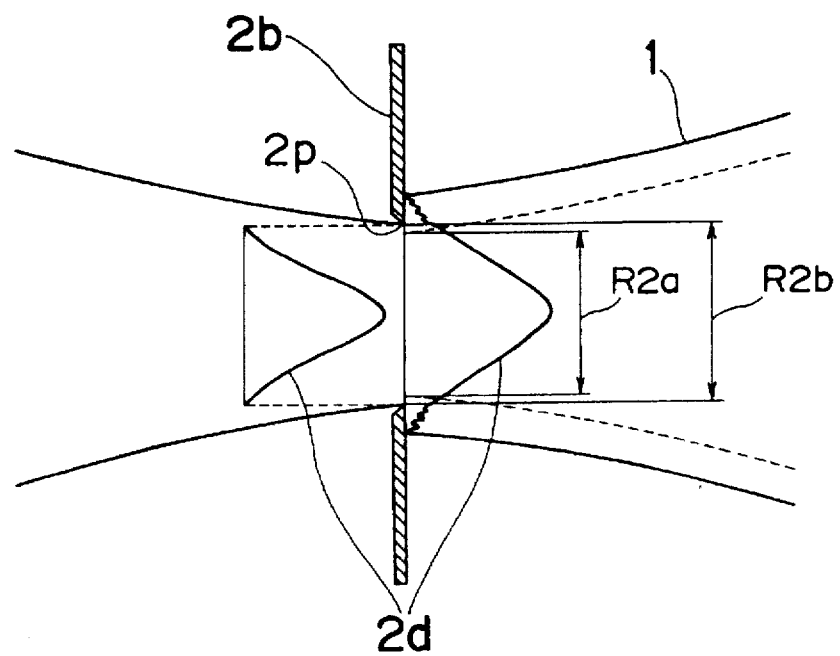
FIG. 2 is a sectional view of a pinhole portion of the first embodiment of the present invention.
Figure 3:
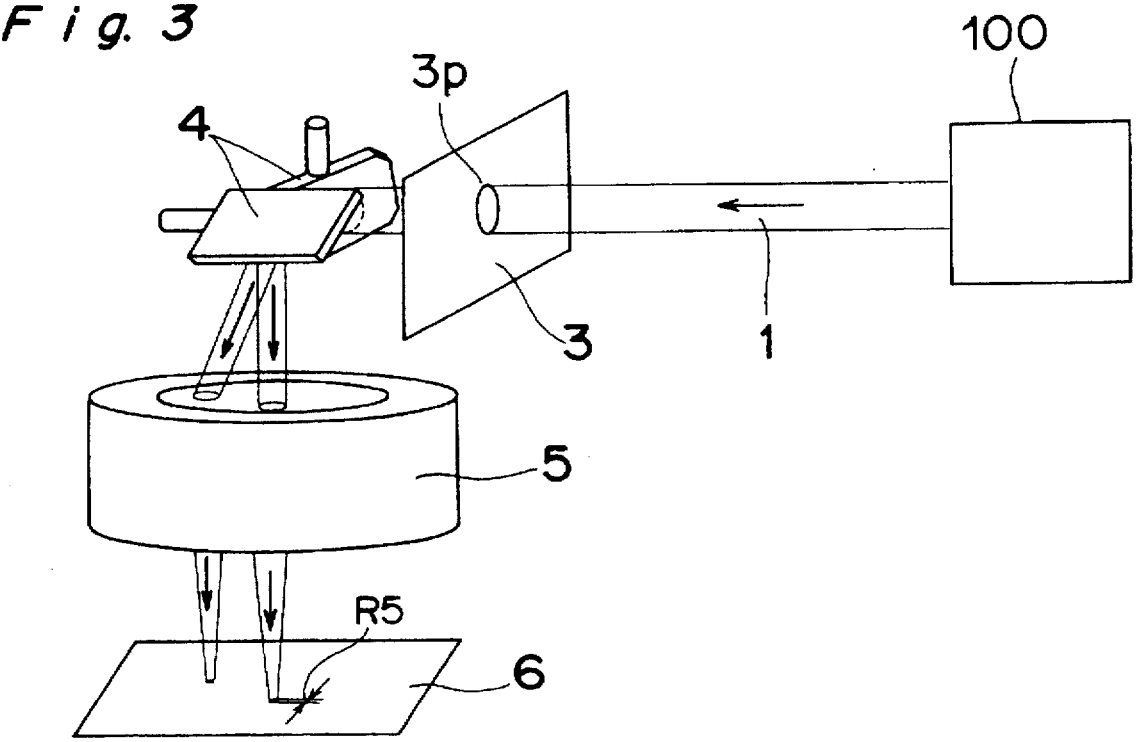
FIG. 3 is a laser processing apparatus according to a second embodiment of the present invention.
Figure 4:
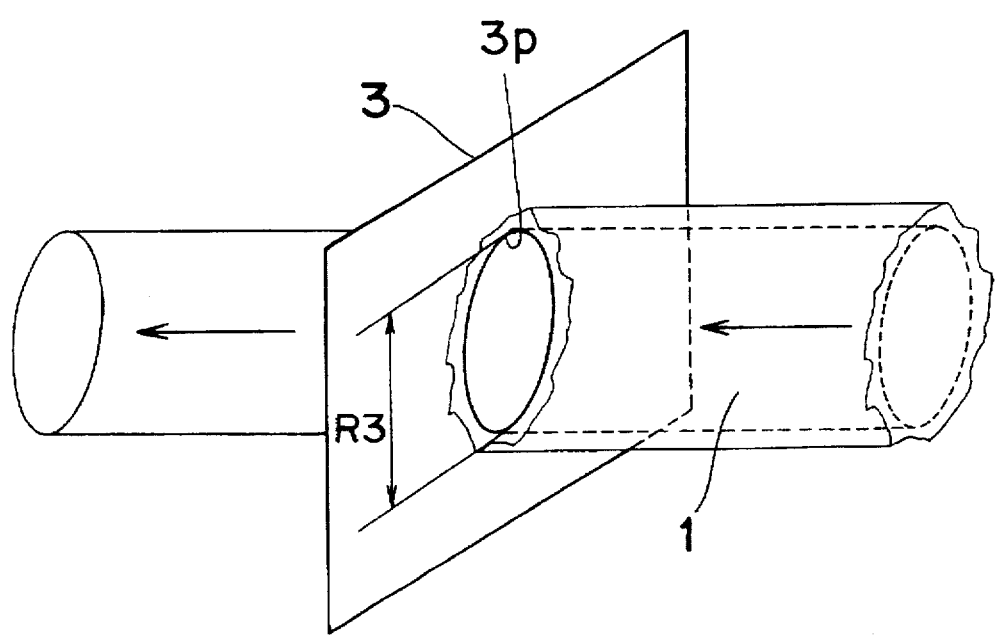
FIG. 4 is a perspective view of an aperture portion of the second embodiment of the present invention.

Embodiments of the present invention will be described below with reference to the accompanying drawings.
First Embodiment FIG. 1 is a perspective view of a construction according to a first embodiment of the present invention. In FIG. 1, there are included a laser beam 1 emitted from a laser oscillator 100, a spatial filter 2, first and second lenses 2a and 2c, and a member 2b having a pinhole portion 2p. The member 2b is preferably made of copper or molybdenum which is resistant to the laser beam. There are further included two mirrors driven by a galvanometer (referred to as galvano-mirrors 4 hereinafter), an fθ lens 5, and a substrate 6. The laser beam 1 is a $CO_2$ laser having a beam diameter of ϕ11 mm, and it is focused by the first lens 2a having a focal distance f=2.5 inches on its optical axis. As shown in FIG. 2 which is a sectional view of the pinhole portion 2p, non-focusing components in the peripheral portion of the focusing spot are removed by the member 2b having a pinhole portion 2p of a hole diameter of ϕ200 μm or less, preferably, ϕ150 μm arranged in the focusing position. Subsequently, the laser beam is restored into a parallel laser beam by the second lens 2c having a focal distance f=3.25 inches, scanned by the galvano-mirrors 4, and then focused by the fθ lens 5 having a focal distance f=4 inches to be used for processing. In the above place, focusing distances of the first and second lenses 2a and 2c and the fθ lens 5 are set so that a spot diameter R2a of the laser beam focused by the first lens 2a (diameter of a portion at which the laser beam intensity becomes $1/e^2$ of its peak intensity ($1/e^2$ diameter), this definition of the spot diameter being same hereinafter) becomes equal to or smaller than a spot diameter R5 of the laser beam focused by the fθ lens 5, while a hole R2b of the pinhole portion of the 2p of the member 2b is set to 1 to 2 times as great as the focusing spot diameter R2a at the focusing point of the first lens 2a. It is more preferable that the hole diameter R2b of the pinhole portion 2p of the member 2b is set to 1 to 1.4 times as great as the focusing spot diameter R2a at the focusing point of the first lens 2a. As one example, it is more preferable that the hole diameter R2b of the pinhole portion 2p of the member 2b is set to 1.4 times as great as the focusing spot diameter R2a at the focusing point of the first lens 2a. If the hole diameter R2b of the pinhole portion 2p of the member 2b is set to less than 1 times as great as the focusing spot diameter R2a at the focusing point of the first lens 2a, diffraction may be occurred around the edge of the pinhole portion 2p. If the hole diameter R2b of the pinhole portion 2p of the member 2b is set to more than 2 times as great as the focusing spot diameter R2a at the focusing point of the first lens 2a, the above effect for cutting off the non-focusing components may be decreased. With the above-mentioned arrangement, there can be obtained in the focusing position of the fθ lens a trace of processing having a shape smaller than the shape of a trace of processing achieved by the conventional apparatus. Furthermore, when the diameter of the laser beam 1 is expanded in the section of the spatial filter 2 as in the first embodiment, a smaller focusing diameter of ϕ150 μm is obtained at the spot diameter R5 in the focusing position of the laser beam 1 which has passed through the fθ lens 5.
Second Embodiment FIG. 3 is a perspective view of a construction according to a second embodiment of the present invention. In FIG. 3, the same components as in FIG. 1 are denoted by the same reference numerals, and no description is provided therefor. In FIG. 3, there is included an aperture member 3 which has a circular opening 3p and is arranged before the galvano-mirrors 4 on the optical axis of the laser beam 1. The aperture member 3 is preferably made of copper or alumite etc. which is resistant to the laser beam. By setting a diameter R3 of the circular opening 3p of the aperture member 3 to a diameter 1 to 1.5 times as great as the diameter of the portion at which the intensity of the laser beam 1 becomes $1/e^2$ of its peak intensity, noise components of light remaining in the peripheral portion of the laser beam 1 as shown in FIG. 4 can be removed, and the shaping of the laser beam 1 can be achieved. If the diameter R3 of the circular opening 3p of the aperture member 3 to a diameter is set to less than 1 times as great as the diameter of the portion at which the intensity of the laser beam 1 becomes $1/e^2$ of its peak intensity, diffraction may be occurred around the edge of the opening 3p. If the diameter R3 of the circular opening 3p of the aperture member 3 to a diameter is set to more than 1.5 times as great as the diameter of the portion at which the intensity of the laser beam 1 becomes $1/e^2$ of its peak intensity, the above effect for cutting off the non-focusing components may be decreased. With the above-mentioned arrangement, even in the laser beam 1 which has passed through the peripheral portion of the fθ lens 5, a spot shape having a circularity (minor axis/major axis) of 0.9 or more is obtained at its focusing point.

Third Embodiment

Figure 5:
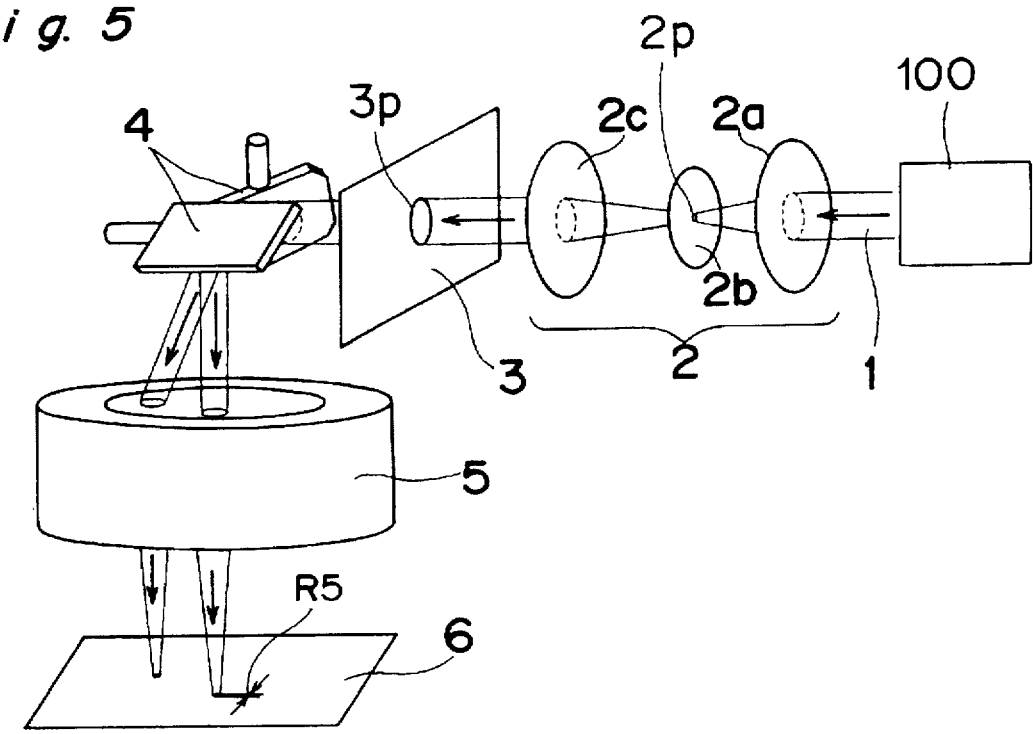
FIG. 5 is a perspective view of a laser processing apparatus according to a third embodiment of the present invention.
Figure 6:
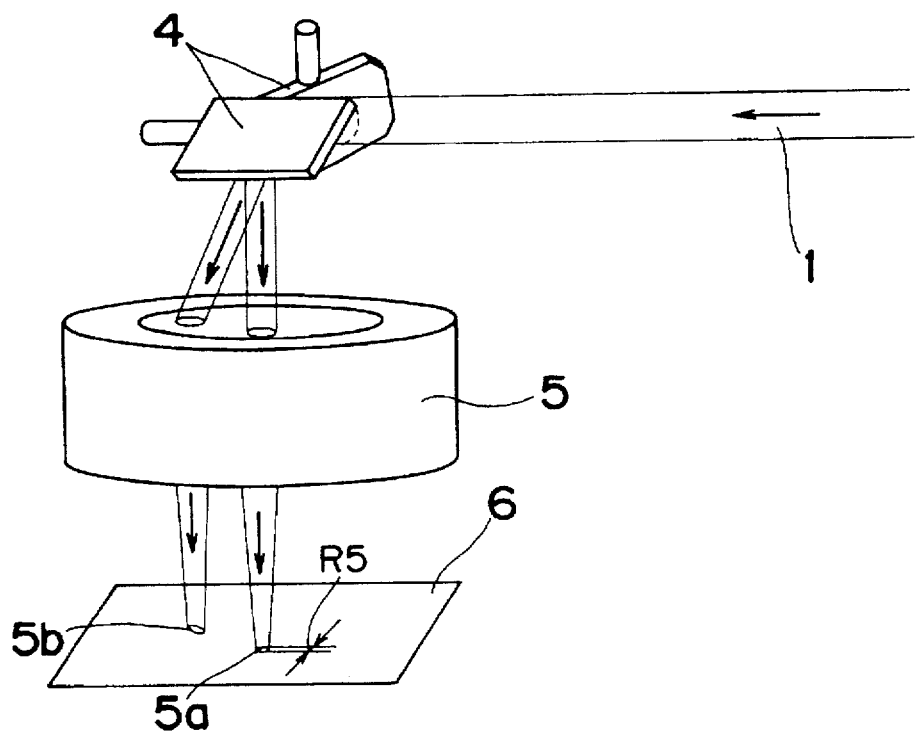
FIG. 6 is a perspective view of a conventional laser processing apparatus employing a galvano-mirror and an fθ lens.

FIG. 5 is a perspective view of a construction according to a third embodiment of the present invention. In FIG. 5, the same components as in FIG. 1 and FIG. 3 are denoted by the same reference numerals, and no description is provided therefor. In FIG. 5, the aperture member 3 of the second embodiment of the present invention is arranged behind the spatial filter 2 of the first embodiment of the present invention on the optical axis of the spatial filter. With the above-mentioned arrangement, the laser beam 1 which has passed through any portion of the fθ lens 5 is able to perform processing with substantially complete circularity, and is able to perform processing in a spot diameter smaller than that of the conventional apparatus.

Fourth Embodiment

Figure 7:
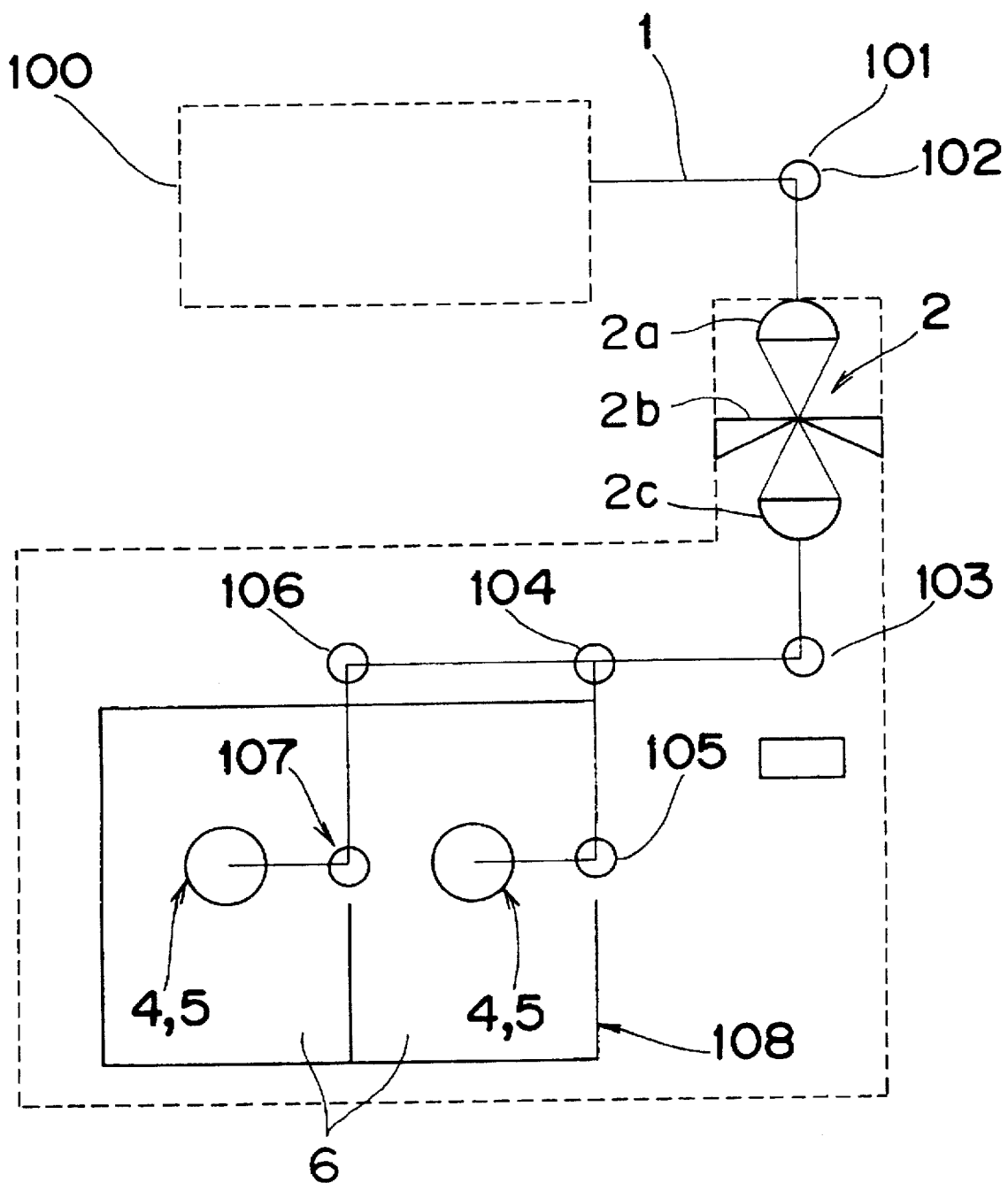
FIG. 7 is a schematic view of a laser processing apparatus according to a fourth embodiment of the present invention.

FIG. 7 is a perspective view of a construction of a laser processing apparatus according to a fourth embodiment of the present invention in which two processing operations can be simultaneously performed. In the apparatus, the laser beam 1 from the oscillator 100 is reflected by a bending mirror 101, is separated into by a beam splitter 102, and then is passed through the spatial filter 2. Then, the laser beam 1 is reflected by a beam splitter 103, and is separated into two laser beams by a beam splitter 104. The first laser beam 1 of the two laser beams is reflected by a bending mirror 105 and is passed through the galvano-mirrors 4 and the fθ lens 5 to process a substrate 6 on an X-Y stage 108. The second laser beam 1 of the two laser beams is reflected by bending mirrors 106 and 107 and is passed through the galvano-mirrors 4 and the fθ lens 5 to process another substrate 6 on the X-Y stage 108. According to the apparatus, the plural substrates 6 can be processed by the laser beam from emitted the one laser oscillator 100.

According to the first embodiment of the present invention, a focusing spot diameter smaller than that of the conventional laser processing apparatus can be obtained, and therefore finer processing can be performed.

According to the second embodiment of the present invention, the shape of the focusing spot of the laser beam which has passed through the peripheral portion of the fθ lens approaches a circular shape. Therefore, no change occurs in the focusing spot shape regardless of the position of the fθ lens through which the laser beam passes, thereby allowing a uniform shape of processing to be obtained.

According to the third embodiment of the present invention, a uniform focusing spot shape can be obtained regardless of the position of the fθ lens through which the laser beam passes, and a focusing spot diameter smaller than that achieved by the conventional processing apparatus can be obtained. Therefore, fine processing can be performed uniformly. The apparatus has great advantage when a distance between the entrance of the galvano-mirrors 4 and the second lens 2c is large and the laser beam 1 may include some noise components between them.

In the embodiments, the laser beam can be emitted from a YAG laser oscillator.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser processing method which is carried out by a laser apparatus comprising: an oscillator; a spatial filter comprising a first convex lens, a member having a pinhole portion, and a second convex lens on an optical axis of the laser beam from an oscillator; two galvano-mirrors; and an fθ lens, the method comprising:

emitting a laser beam from the oscillator;

focusing the laser beam by the first convex lens;

removing non-focusing components in a peripheral portion of a focusing spot performed by the first convex lens by passing the laser beam which has passed through the first convex lens through the pinhole portion, a focal distance of the first convex lens being set so that a focusing diameter of the laser beam at the pinhole portion of the member is equal to or smaller than a focusing diameter of the laser beam which has passed through the fθ lens;

restoring the laser beam which has passed through the pinhole portion into a parallel laser beam by the second convex lens;

scanning the laser beam which has passed through the second convex lens by means of the two galvano-mirrors;

focusing the scanned laser beam by means of the fθ lens on a work to execute processing of the work; and wherein a hole diameter of the pinhole portion of the member is set to 1 to 2 times as great as a diameter of the focusing spot at a focusing point of the first convex lens, while the focusing spot diameter of the laser beam focused by the first convex lens is a diameter of a portion at which laser beam intensity becomes $1/e^2$ of its peak intensity.

2. A laser processing method which is carried out by a laser apparatus comprising: an oscillator; a spatial filter comprising a first convex lens, a member having a pinhole portion, and a second convex lens on an optical axis of the laser beam from an oscillator; two galvano-mirrors; and an fθ lens, the method comprising:

emitting a laser beam from the oscillator;

focusing the laser beam by the first convex lens;

removing non-focusing components in a peripheral portion of a focusing spot performed by the first convex lens by passing the laser beam which has passed through the first convex lens through the pinhole portion, a focal distance of the first convex lens being set so that a focusing diameter of the laser beam at the pinhole portion of the member is equal to or smaller than a focusing diameter of the laser beam which has passed through the fθ lens;

restoring the laser beam which has passed through the pinhole portion into a parallel laser beam by the second convex lens;

scanning the laser beam which has passed through the second convex lens by means of the two galvano-mirrors;

focusing the scanned laser beam by means of the fθ lens on a work to execute processing of the work: and wherein a hole diameter of the pinhole portion of the member is set to 1 to 1.4 times as great as a diameter of the focusing spot at a focusing point of the first convex lens, while the focusing spot diameter of the laser beam focused by the first convex lens is a diameter of a portion at which laser beam intensity becomes $1/e^2$ of its peak intensity.

3. The laser processing method as claimed in claim 1, wherein the oscillator is $CO_2$ laser oscillator.

4. The laser processing method as claimed in claim 3, wherein the oscillator is a $CO_2$ laser oscillator.

5. A laser processing method which is carried out by a laser apparatus comprising: an oscillator; a spatial filter comprising a first convex lens, a member having a pinhole portion, and a second convex lens on an optical axis of the laser beam from an oscillator; two galvano-mirrors; and an fθ lens, the method comprising:

emitting a laser beam from the oscillator;

focusing the laser beam by the first convex lens;

removing non-focusing components in a peripheral portion of a focusing spot performed by the first convex lens by passing the laser beam which has passed through the first convex lens through the pinhole portion, a focal distance of the first convex lens being set so that a focusing diameter of the laser beam at the pinhole portion of the member is equal to or smaller than a focusing diameter of the laser; beam which has passed through the fθ lens;

restoring the laser beam which has passed through the pinhole portion into a parallel laser beam by the second convex lens;

scanning the laser beam which has passed through the second convex lens by means of the two;

focusing the scanned laser beam by means of the fθ lens on a work to execute processing of the work; and between the restoring of the laser beam and the scanning of the laser beam, removing non-focusing components in a peripheral portion of the parallel laser beam formed by the second convex lens by passing the parallel laser beam through a circular aperture of a member arranged between the second convex lens and an entrance of the galvano-mirrors on an optical axis of the laser beam from the oscillator.

6. The laser processing method as claimed in claim 1, further comprising, between the restoring of the laser beam and the scanning of the laser beam, removing non-focusing components in a peripheral portion of the parallel laser beam formed by the second convex lens by passing the parallel laser beam through a circular aperture of a member arranged between the second convex lens and an entrance of the galvano-mirrors on an optical axis of the laser beam from the oscillator.

7. The laser processing method as claimed in claim 2, further comprising, between the restoring of the laser beam and the scanning of the laser beam, removing non-focusing components in a peripheral portion of the parallel laser beam formed by the second convex lens by passing the parallel laser beam through a circular aperture of a member arranged between the second convex lens and an entrance of the galvano-mirrors on an optical axis of the laser beam from the oscillator.

8. The laser processing method as claimed in claim 3, further comprising, between the restoring of the laser beam and the scanning of the laser beam, removing non-focusing components in a peripheral portion of the parallel laser beam formed by the second convex lens by passing the parallel laser beam through a circular aperture of a member arranged between the second convex lens and an entrance of the galvano-mirrors on an optical axis of the laser beam from the oscillator.

9. The laser processing method as claimed in claim 8, wherein a diameter of the circular opening of the aperture member is set to a diameter 1 to 1.5 times as great as a diameter of a portion at which intensity of the laser beam becomes $1/e^2$ of its peak intensity.

10. A laser processing method which is carried out by a laser apparatus comprising: an oscillator; two galvano-mirrors; an fθ lens; and a member having a circular aperture before an entrance of the galvano-mirrors on an optical axis of the laser beam from the oscillator, the method comprising:

emitting a laser beam from the oscillator;

removing non-focusing components in a peripheral portion of the laser beam from the oscillator by passing the laser beam which is emitted from the oscillator through the circular aperture;

scanning the laser beam which has passed through the circular aperture by means of the two galvano-mirrors;

focusing the scanned laser beam by means of the fθ lens on a work to execute processing of the work; and wherein a diameter of the circular opening of the aperture member is set to a diameter 1 to 1.5 times as great as a diameter of a portion at which intensity of the laser beam becomes $1/e^2$ of its peak intensity.

11. The laser processing method as claimed in claim 10, wherein the oscillator is a $CO_2$ laser oscillator.

* * * * *